Oct. 4, 1966  J. R. VYCE  3,277,304
PHOTOSENSITIVE TWO-AXIS ANGLE MEASURING DEVICE
Filed Jan. 17, 1963  2 Sheets-Sheet 1
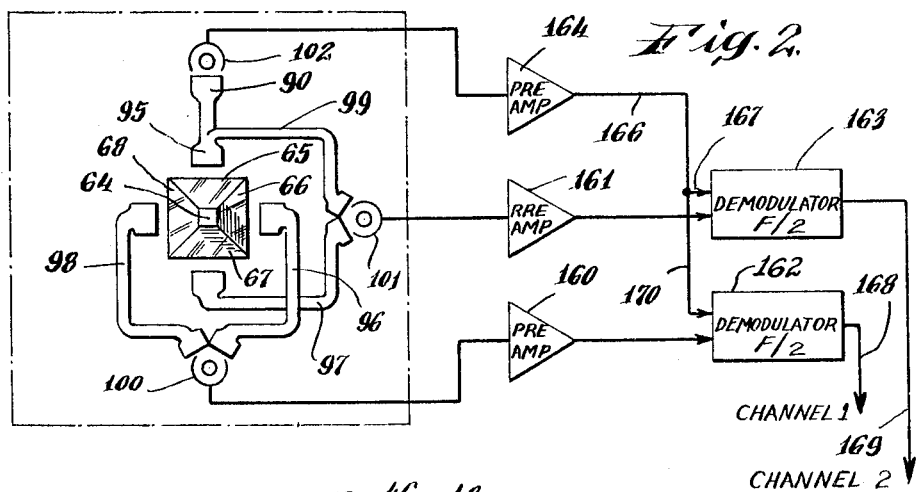
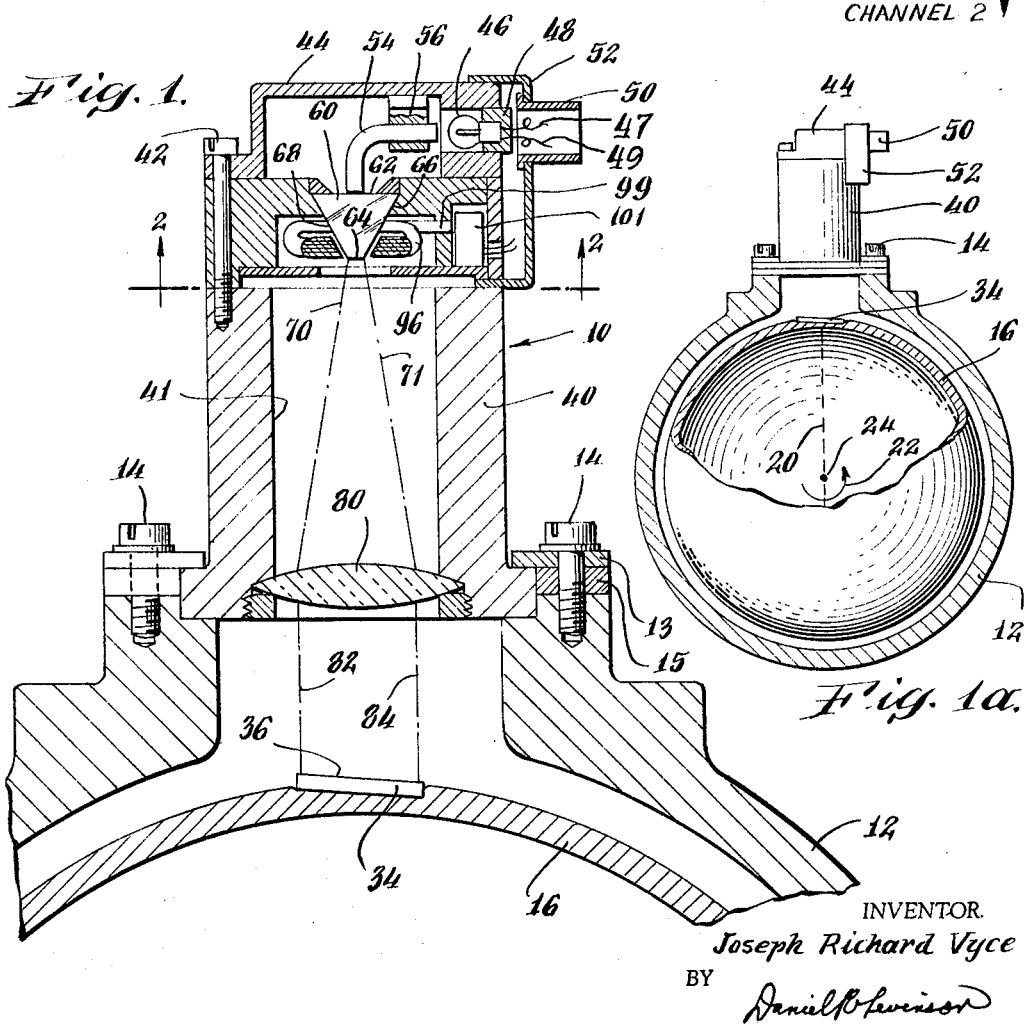
INVENTOR.
Joseph Richard Vyce
BY
Daniel B. Levinson
ATTORNEY.

Oct. 4, 1966     J. R. VYCE     3,277,304
PHOTOSENSITIVE TWO-AXIS ANGLE MEASURING DEVICE
Filed Jan. 17, 1963     2 Sheets-Sheet 2

INVENTOR.
Joseph Richard Vyce
BY
Daniel R Levinson
ATTORNEY.

United States Patent Office 3,277,304
Patented Oct. 4, 1966

3,277,304
PHOTOSENSITIVE TWO-AXIS ANGLE
MEASURING DEVICE
Joseph Richard Vyce, Ridgefield, Conn., assignor to The
Perkin-Elmer Corporation, Norwalk, Conn., a corporation of New York
Filed Jan. 17, 1963, Ser. No. 252,116
11 Claims. (Cl. 250—203)

This invention relates to a device for determining the angular position of a reflector and, therefore, the angular position of an object carrying the reflector. More particularly, the device is capable of monitoring the angular position of an object-carrier mirror about two axes perpendicular to the line of sight. As will be more fully apparent hereinafter, the device is particularly useful for measuring the position of a rotating body and is relatively insensitive to a systematic wobble thereof. For this reason, the invention is especially suitable for determining the position of such rotating bodies as the rotor of a gyroscope, but is not limited to such uses.

Briefly, the device operates on the principle that a reflector mounted on an axis of rotation, which is not exactly perpendicular to the reflecting surface, will cause a beam of light generally parallel to this axis to be reflected along a surface of a cone as the shaft rotates. When the line of sight is parallel to the rotation axis and essentially coincident therewith, the axis of this cone (or the center of the circle made by the beam of light on the plane lying generally perpendicular thereto) will be on the line of sight. If the mirror rotation axis is now tilted about either axis perpendicular to the rotation axis, the axis of the cone or the center of the circle will no longer be along the line of sight. In fact, the cone axis or circle center will move a distance proportional to the tilt of the rotation axis about axes perpendicular thereto (assuming this tilt involves only small angles). The device essentially determines the position of the axis of the cone or center of the circle and, therefore, this angular tilt of the rotation axis.

An object of the invention is the provision of a device for measuring the angular position of a rotating body, which device is relatively insensitive to a periodic wobble of the rotating body.

Another object of the invention is the provision of a device for determining the angular position of a body, rotating about one axis, relative to the two axes perpendicular to this rotation axis.

Further objects and advantages of the invention will become obvious to one skilled in the art upon reading the following specification in conjunction with the accompanying drawings in which:

FIG. 1 is a vertical section through the center of the device, as utilized for monitoring the angular position or precession of a gyroscope rotor;

FIG. 1a is a vertical section on a reduced scale through the gyroscope housing, showing the entire spherical gyroscope rotor partially broken away to show the gyroscopic axis;

FIG. 2 is a diagrammatic representation of the sensing and detecting parts of the apparatus shown in FIG. 1 as seen along the lines 2—2, as well as a schematic representation of the electrical circuit used therewith;

Figure 3:
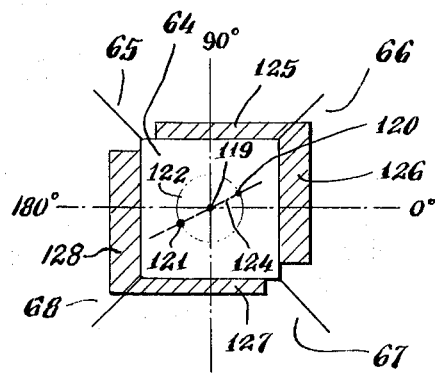
FIG. 3 is a schematic representation of a square beam of light as returned to the sensing prism by the rotating mirror in different positions thereof when the rotation axis thereof is parallel to the line of sight of the inventive device.

In FIG. 1, an exemplary embodiment of the inventive alignment device is shown generally at 10 as being mounted to the outer housing 12 of a conventional gyroscope by means of suitable fasteners such as screws 14, flanged positioning washers 13, and spacing shims 15. The gyroscope (see FIG. 1a) may comprise a relatively heavy spherical rotor 16 having a relatively large radius so as to have a large moment of inertia. This rotor is mounted so as to be free to rotate about vertical axis 20, and it is caused to rotate rapidly about this axis as indicated by arrow 22. As is well-known such a gyroscope rotor will maintain its axis of rotation 20 fixed in space even though the device carrying it (exemplified by housing 12) be moved or turned in any manner. Since the manner in which the rotor is suspended for completely free orientation within the housing forms no part of this invention, this means it not illustrated. It should be noted that this suspension allows the rotor to be oriented in any manner relative to its housing (and anything connected to the housing including the vehicle, ship, aircraft, or other device intended to be guided by the gyroscope). Examples of such mountings for miniature gyros of the type illustrated include utilization of air or electrostatic or magnetic force as the suspension medium. Although conventional mechanical gimbals may also be utilized, it is with the type of suspensions previously mentioned that one problem solved by the invention, namely, the "working" or shifting of the rotor axis with time, is encountered, although the invention is also useful for monitoring the position of any conventional gyroscope.

The relatively heavy gyro rotor 16 will rotate about axis 20, but may assume any angular position relative to the housing 12 because of its suspension and this may be considered as tilting about mutually perpendicular horizontal axes (e.g., the axis in the plane of the paper through rotor center 24 and the axis perpendicular to the paper through this same point). Therefore, axis 20 may tilt about either horizontal axis and thus may assume various angular positions relative to both the plane of the paper and to a vertical plane perpendicular to the paper intersecting the center of the rotor 24.

In order to determine the angle that the spin axis 20 of the rotor makes with each of the just two mentioned horizontal axes, a mirror 34 is mounted on the upper surface of rotor 16. Mirror 34 has a reflecting surface at 36, which is intentionally positioned so that it is not quite perpendicular to the spin axis 20. This canting or angling of the reflecting surface of the mirror is exaggerated in FIG. 1, the actual angle of cant being on the order of perhaps a few mils (a mil being $\frac{1}{6400}$ of an entire circle). This angle is chosen so as to be appreciably larger (say, three times as large) as any "working," shifting, or wobbling of the axis which may be encountered in small gyros without mechanical restraints (i.e., gimbals) upon use.

The device of the invention monitors the rotating mirror so as to determine the position of the spin axis 20 and therefore the position of the gyro rotor 16 relative to the device to which the housing 12 is attached. The monitoring device may comprise a housing 40 in which are mounted the optical elements for collimating a beam of light in a manner of an autocollimator. Attached by means of, for example, screw 42 to this housing 40 is upper housing 44, in which micro lamp 46 is mounted. This lamp may be held in an aperture in upper housing 44 by means of a small socket 48 and is energized by a low voltage source of electrical current over leads 47 and 49. These leads may extend out of the housing through a small tube 50 mounted in a metal cap 52. Micro lamp 46 will, therefore, illuminate one end of a bundle of fiber optical elements 54, which is maintained in position by a small bracket 56 depending from the upper housing 44. As is well known, fiber optics comprise a group of thin thread-like transparent elements which have the property of maintaining light within these thin threads by means of internal reflections within each thread. Therefore, the light introduced at the right hand end of this fiber optic bundle will appear substantially unattenuated at the lower end adjacent prism 60. Prism 60 is polished and clear at both its upper surface 62 and its lower or nose portion 64. For this reason, the light leaving the lower end of the fiber optic bundle will pass through the prism 15 so as to emanate as a beam of light defined by the edge rays 70 and 71. Because of the fact that the clear nose portion 64 thus defines the cross section of this light beam, the nose portion acts as a limiting aperture or slit. This somewhat diverging beam is collimated by an optical system as indicated by the finally emerging parallel rays 82 and 84. Although any optical system may be utilized, a single objective lens 80 is shown as an exemplary optical system.

The bundle of slightly diverging rays bounded by edge rays 70 and 71, will collimate by lens 80 so as to emerge therefrom as beam of parallel rays, bounded by rays 82 and 84. These parallel rays 82 and 84 impinge upon and are reflected by the metallic reflective coating 36 of the canted mirror 34 so as to be returned generally back along the direction from which they originally came. If the reflective surface of mirror 34 were exactly perpendicular to the spin axis 20 of rotor 16 and the gyroscope is in a neutral position (i.e., with axis 20 lying exactly vertical), then the rays would be returned exactly along the line from which they came so as to be returned back through the optical system and imaged back (i.e., auto-collimated) onto the nose portion 64 of prism 60.

Before describing the effect of mounting the mirror 34 at a small angle of cant, the shape of sensing prism 60 will first be described. In addition to a large flat upper surface 62 and small flat nose portion 64, this prism includes four slanted sides 65, 66, 67 and 68 (see also FIG. 2). Thus, the general shape of the prism is that of a four-sided pyramid with the apex cut off or truncated as at 64. Each of the slanted sides 65–68 are silvered so as to reflect all the light that may impinge on their outer surfaces. Therefore, any of the rays returning from mirror 34 which may strike any of these slanted surfaces will be reflected away from the center of the prism in a horizontal direction. Four additional bundles of fiber optics are so positioned as to receive any light so reflected from these slanted surfaces. In particular, a fiber optic bundle 97 is positioned to receive the light reflected from slanted surface 67, and a pair of similar bundles 96 and 98 receive such reflected light from surfaces 66 and 68, respectively. The fiber optic bundle 95 associated with surface 65 includes two branches 90 and 99. The ends of fiber optic bundles 96 and 98 remote from the prism are so positioned as to feed the light onto a first photosensitive detector 100. Similarly, bundle 97 and branch 99 of bundle 95 are positioned so as to cause the light leaving the ends thereof to impinge upon a second detector 101. The cross-section of all of these bundles is substantially identical in area. The other branch 90 of bundle 95 feeds a reference photosensitive detector 102.

Assuming the gyroscope and therefore axis 20 are in the neutral or aligned position relative to housing 12 and therefore relative to the axis of the monitoring device, rays such as 82 and 84 will be reflected back by canted mirror so as to trace out the surface of a cone, the axis of which will be parallel to and coincident with the longitudinal axis of the shaft. In fact, rotation of the rotor and the canted mirror 34 will always cause such a cone to form, the axis being always aligned with the spin axis 20, even when the latter is tilted from its neutral position. This cone will intersect the plane of the nose 64 as a circle, the center of which will be at the intersection of the cone axis with the nose plane. When the shaft is in its neutral or aligned position, this center of the circle (which circle represents also the locus of points traced out by the center of the redirected, reimaged square of light from the nose) will fall on the geometric center 119 of the nose. This is best illustrated in FIG. 3 where the center of the returning image of the square for one position of rotation of the shaft and mirror 34 is schematically indicated by point 120.

This center point 120 will follow the circle schematically shown at 122 as the rotor 16 rotates and will appear after one-half turn (180°) of shaft rotation at position 121. In particular, the radius 124 of the circle will be equal to twice the angle of cant of the mirror times the focal length of the optical system 80. When the center of the image is at point 120, that part of the redirected, refocussed image shown at 126 will impinge upon surface 66 of the prism so as to fall upon detector 100 by transmission through fiber optic bundle 96. At this same time, a part 125 of the image will impinge upon prism surface 65 and be transmitted by optical bundle 95, 99 to detector 101. When the shaft has rotated exactly one-half revolution so that the center of the return image is at 121, that part of the image referenced 123 will fall upon the opposite slanted surface 68 of the prism; and this amount of light (equal to that at 126) will be conducted by bundle 98 to the same detector 100. At this latter time part 127 of the return square image will be reflected by prism surface 67 through bundle 97 to detector 101.

Figure 3A:
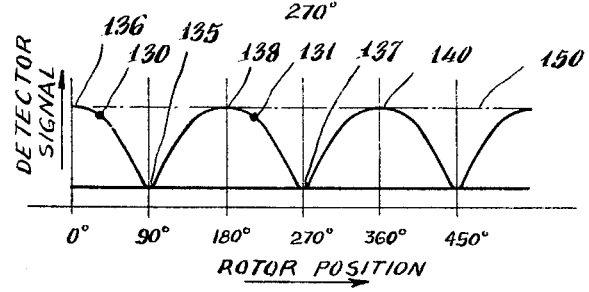
FIG. 3a is a schematic representation of an electrical signal produced from the condition shown in FIG. 3.

FIG. 3a illustrates the electrical signal output of detector 100 and shows that the amount of light reaching detector 100 will vary in a periodic manner. More specifically, when the rotor and mirror are so positioned that the center of the image is on the line referenced 0° in FIG. 3, the maximum amount of light will reach surface 66 and therefore the detector 100; this point is referenced 136 in FIG. 3a. When the rotor has turned 90°, the center of the image will be at the uppermost point on circle 122; and no light will impinge on either surface 66 or 68. For this reason, no light will reach the detector 100 and the electrical output thereof will be at its minimum point as shown at 135 in FIG. 3a. When the rotor has turned another 90°, the center of the image will be at the extreme left hand part of circle 122 (on the line referenced 180°) so as to cause a maximum amount of light to reach surface 68 and therefore cause another maximum of the detector output as shown at 138 in FIG. 3a. A further 90° rotation will bring the center of the image to the bottom of circle 122 (i.e., at the 270° point); in this position no light reaches either of the surfaces 66 and 68 so that a minimum detector signal as shown at 137 in FIG. 3 will be generated. When the rotor has made an additional quarter turn, the center of the image will once again be at the extreme right hand part of circle 122. Thus, a maximum amount of light will impinge on surface 66 and a maximum detector signal as shown at 140 will be generated. Obviously, further rotations of the rotor will cause an exact repetition of this cyclical variation in the output of detector 100. Points 130 and 131 in FIG. 3a correspond to positions of the center of the return image shown at 120 and 121, respectively.

Figure 4:
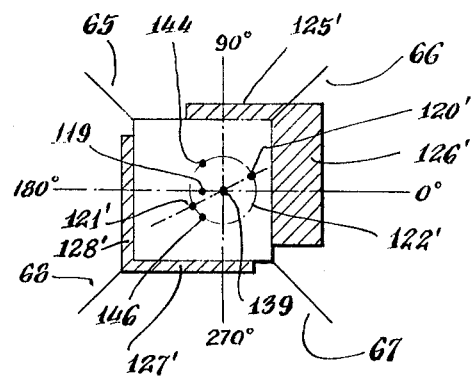
FIG. 4 is a schematic representation of how a square beam of light is returned by the mirror at different positions when its rotation axis is not parallel to the line of sight.

In FIG. 4 the effect of a tilt of the spin axis 20 about a horizontal axis, perpendicular to plane of the paper and through center point 24 in FIG. 1, on the returning images to the sensing prism 60 is shown. In particular this figure shows the effect on the returning image when the spin axis 20 has tilted about point 24 in a clockwise direction (as seen in FIG. 1). The effect of such a tilting of the spin axis will be to cause the center of the circle about which the center of the square image rotates to move to the right a certain amount (see FIG. 4).

Figure 4A:
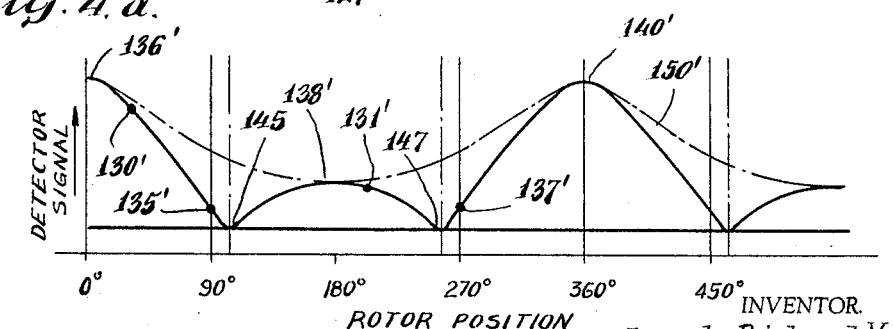
FIG. 4a shows the electrical signal produced by the device when the situation shown in FIG. 4 exists.

Thus, the center of the square image shown at one position at 120' will now move about circle 122', the center of which is at point 139. This center point (which is the intersection with the plane nose portion 64 of the spin axis 20) is now positioned a small distance to the right of the geometric center 119 of the prism nose 64. As in FIG. 3, portion 126' represents the light which will strike slanted surface 66 when the center of the returning square image is at point 120'. At this same time, portion 125' will impinge upon surface 65 of the prism. When the rotor 16 has rotated 180° about its longitudinal axis to point 121', portions 128' and 127' will impinge upon slanted surface 68 and 67, respectively. It will therefore be seen that the detector 100 will receive more light (as represented by portion 126') when the shaft is near the zero rotation position than when it has rotated 180° therefrom. Thus, as shown in FIG. 4a, the signal generated by detector 100 will have a high value at point 136' (at the 0° point) while it will have a considerably lower value at 138', corresponding to a position of the rotor one-half turn later. It should be noted that when the rotor is half-way between the 0° and 180° points (i.e., the center of the returning square image is at the uppermost point on circle 122') some of the image will still impinge on slanted surface 66 of the prism; the electrical signal corresponding to this point is shown at 135'. At a slightly later rotor rotation position the center of the square will be at point 144, directly above the center (119) of the prism nose. It is at this point that no part of the returning square image will fall on either prism surface 66 or 68; and therefore, it is at the corresponding point 145 that the detector signal will be at a minimum. The next minimum will occur when the center of the returning image is at point 146, directly below the center of the prism nose; and the electrical signal corresponding to this point is shown at 147 in FIG. 4a. When the rotor has reached the 270° rotation point, the electrical signal will have the value shown at 137'. When it has made a complete turn so as to come to the 360° (or 0°) point again, the electrical signal will reach a maximum once more as shown at 140'. Obviously, the electrical signal will then keep generating a similar pattern over and over again.

It should be noted that the electrical signal in FIG. 4a at point 130' corresponding to the time when the center of the returning square image center is at point 120' no longer has the same value as the electrical signal at point 131' corresponding to the time (of 180° rotor rotation later) when the center of the square image is at 121'. Indeed, this inequality is characteristic of any two points 180° apart when the spin axis is tilted (as opposed to the equality of such 180° spaced points when this axis is parallel to the optical axis of the monitoring device) and may be used as both a qualitative and quantitative indication of the rotor axis tilt. In particular, the difference between the signals 180° apart is directly proportional (for small angles) to the axis tilt, so that sampling of the detector signal at such 180° spaced points and subtraction of the values will yield a direct measurement of the spin axis tilt. If this subtraction is done in a phase-sensitive manner, determination of which way the axis tilted (as well as the magnitude of this angle) may be determined. In fact, since the maximum value (at point 136') of the FIG. 4a detector output signal is greater than the maximum of the FIG. 3a curve (at 136) by an amount also proportional to the angle of spin axis tilt, a single measurement of this maximum and subtraction of the standard value of the zero tilt maximum (i.e., the FIG. 3a maximum) will yield a measurement of the axis tilt. Similarly, the lesser maximum (at point 138') is also less than maximum 138 by this same amount, proportional to the shaft tilt.

In order to better illustrate these alternative methods of utilizing the detector signal, a specific example will be given. Let us assume that the mirror 36 is so angled or canted relative to the spin axis 20 that the center of the return image subscribes a circle (such as shown at 122 or 122') having a radius of five units. When the spin axis is aligned with the optical axis of the monitoring device, this circle will be symmetrically arranged about the center of the prism nose as shown in FIG. 3. Therefore, at the 0° rotor position the return square image will be shifted to the right five units so as to make the part thereof falling on slanted surface 66 having a width of five units. Similarily, when the rotor has rotated to the 180° point a five-unit wide part of the image will fall on slanted surface 68. Therefore, each of the maximum points of the detector signal shown in FIG. 3a (i.e., points 136, 138, etc.) will have a value of five units. If now the spin axis 20 tilts about an axis perpendicular to the paper and through point 24 in FIG. 1 by an amount to cause the circle 122' to shift three units to the right (see FIG. 4), the amount of light reaching surface 66 at the 0° point will be eight units wide. When the rotor has rotated to the 180° point, the width of the return image falling on surface 68 will be only two units wide. Therefore, the maximum detector signal at 0° (point 136' in FIG. 4a) will be eight units, and the secondary maximum at 180° (point 137') will be two units. The difference between these two values will always be twice the value of the shifting of the circle so that this difference may be used directly for measuring the tilt of the spin axis. Similarly, the greater maximum (eight units) and the lesser maximum (two units) will each differ from the centered value (five units) by the same amount (namely, three units) as the image shift. In general, the greater and lesser maximum detector signal values will be symmetrically arranged about the centered value so that their difference therefrom is proportional to the spin axis tilt, and their difference from each other is proportional to twice this tilt angle. For this reason, either one of the greater or lesser maximum detector signal values alone will give a direct measurement of this tilt; in order to eliminate systematic errors (caused by wobble, for example) it is preferable to substract the two different maximum values. If the wobble is at the same frequency as the rotor rotation, the effect will be generally to increase (or decrease) the effective radius of the circle, thereby adding a more or lesser equal additional wobble signal to both maxima; and this wobble error would be cancelled out by subtraction of the values of these maxima. However, if the wobble is of a different frequency, the two chosen values for measured maxima may contain different error signals caused by the wobble. This error would not be eliminated by merely substracting the two signals. For this reason the preferred method of signal processing (hereinafter described) is so designed that substantially all wobble error is eliminated.

A comparison of FIG. 4a with FIG. 3a will show how the electrical signal of one of the detectors varies as the spin axis tilts about one of the horizontal axes through center point 24 (see FIG. 1). Although the detector signal shown in FIG. 4a differs in two respects from that shown in FIG. 3a, wave analysis proves that the shifting of the minimum points (145 and 147) from the 90° and 270° points (135' and 137') is a second order effect while the difference in the various maxima is a first order effect. In order to best illustrate this latter variation, a dot-dash line 150 has been drawn so as to connect the maxima points in FIG. 3a, and a corresponding curve 150' has been drawn in FIG. 4a. Physically, line 150 and curve 150' represent the magnitude of the wave component having a frequency of one-half the fundamental detector signal frequency. By fundamental detector signal frequency is meant the frequency of minima generated, and therefore this fundamental frequency is twice the shaft rotation frequency. As shown by the fact that line 150 in FIG. 3a is both straight and horizontal, the detector signal has no component at this half frequency when the spin axis is parallel to the optical axis of the monitoring device. However, when this rotor spin axis is tilted about the horizontal axis perpendicular to the paper through the center 24 of the spherical rotor, the signal from detector 100 will have a component at this half frequency as shown by the curve 150' in FIG. 4a. Similar tilting of the shaft about the horizontal axis in the plane of the paper (and through center point 24) would cause a similar effect in the signal of detector 101. Since the system operates symmetrically about these two axes, no detailed description of the signals from detector 101 is deemed necessary.

It should be noted that the tilting of the spin axis about the horizontal axis perpendicular to the plane of the paper will cause no difference in the signal generated by detactor 101 (except as to a small second order factor). In other words, as may be seen in FIG. 4, substantially the same amount of radiation will impinge upon one surface 65 of the prism (as shown at 125') as will impinge on the opposite surface 67 180° later (as shown at 127'). Therefore, any tilt of the spin axis which has no component about the axis defined by a horizontal line in the plane of the paper (and through point 24) will produce a signal at detector 101 which has the same general shape as shown in FIG. 3a. In order to keep this second order cross-modulation factor small, it is preferable that the axis of the monitoring device be kept within a small angle of the spin axis of the rotor. This may be accomplished by conventional servo-mechanism techniques, the correction necessary to keep the optical axis coincident with the spin axis yielding the final read out.

As shown in FIG. 2, the outputs from detectors 100 and 101 are fed to pre-amplifiers 160 and 161, respectively, which in turn feed the amplified signals to demodulators 162 and 163, respectively. These demodulators operate so as to filter out the half frequency error signal from the full frequency detector signals. Detector 102 will supply a time reference signal to pre-amplifier 164, since some light will strike prism surface 65 and therefore be carried to this detector by fiber optic bundle 90 every time the rotor rotates about its longitudinal axis one full turn. The signal from detector 102 will therefore have a frequency of one-half of the fundamental frequency of the other two detectors. Therefore, the signal from detector 102, after amplification, appearing at 166 may be fed by leads 167 and 170 to each of the demodulators 162 and 163 to provide this half-frequency demodulating reference. Phase sensitive demodulators, which pass only a certain frequency (F/2 here) A.C. component and which will yield a positive or negative D.C. output depending on the phase relationship of this A.C. component relative to a reference signal (from detector 102, pre-amplifier 164, leads 166, and leads 167 or 170, respectively) of this same frequency, are known in the art. Demodulator circuits 162 and 163 may preferably be of this type. The final output of demodulator 162, which contains the demodulated half-frequency error signal, if any, corresponding to a tilt of the spin axis of rotor 16 about the horizontal line perpendicular to the plane of the paper (and through point 24) in FIG. 1 will appear at final output 168 and is labeled channel 1. In a similar manner the demodulated half-frequency signal proportional to the tilt of the rotor spin axis about the axis defined by a horizontal line in the plane of the paper (and through point 24) will appear at the second final output 169 (labeled channel 2).

Each of these two final outputs will be either a positive or negative D.C. signal depending on which part of the original fundamental detector output signal (see FIG. 4a) had the larger value. Thus, if the spin axis of the shaft had tilted about the horizontal line (through 24) perpendicular to the paper in a counterclockwise direction in FIG. 1, the center of the circle generated by the center point of the returning square image, instead of being to the right of the prism nose center 119 in FIG. 4, as shown at 139, woulld instead be to the left of prism nose center 119. If this counterclockwise tilting were by the same amount as the clockwise tilting shown in FIGS. 4 and 4a, the output of detector 100 would appear like that shown in FIG. 4a but would be shifted 180° relative thereto (i.e., would have a high maximum value, like those shown at 136' and 140', at the 180° point, and low maximum values, as shown at 138', at the 0° and 360° points). The time reference signal from detector 102 will, of course, appear every (360°) full turn of the shaft and therefore gives a reference from which the phase relationship of the half-frequency error signal (curve 150' in FIG. 4a) can be determined. If this error signal for detector 100 has its greater maximum value between the —90° and the 90° (or between the 270° and 450°, etc.) points referenced by the output of the reference channel at 170 (as does the curve in FIG. 4a), then the final D.C. output of channel (at 168) will have one sign (say, positive). If the error signal has the greater maximum value between the 90° and 270° points (caused by tilting of the shaft axis in a counterclockwise direction), the final D.C. output at 168 will have the opposite sign (say, negative). Therefore, the direction of tilt of the spin axis (and therefore the gyroscope) about the horizontal axis perpendicular to the plane of the paper is indicated by the sign of the final output of channel 1 at 168. In a similar manner, not only the amount, but also the direction (as determined by whether the greater maximum is between 0° and 180° or between 180° and 360°) of tilt of the spin axis about the horizontal in the plane of the paper will be given by the channel 2 output at 169 by its sign and magnitude, respectively.

The reason that the illustrated preferred system of determining the magnitude and direction of the tilt of the longitudinal axis about either of the perpendicular horizontal axes is substantially insensitive to virtually all type of wobble of the shaft is as follows. Since the signal processing system (demodulators 162 and 163) are essentially insensitive to any signal of a frequency other than one-half of the fundamental detector frequency (the fundamental signal frequency being twice the rotor rotation frequency so that one-half of the fundamental frequency is the shaft rotation frequency), all other wobble frequency components will be filtered out or rejected by the demodulators. In addition, a rotor wobble at the rotation frequency will only have the effect of increasing (or decreasing) both parts of the one-half frequency error signal by substantially the same amount. In other words, both of the points corresponding to 136' and 138' in FIG. 4a will have values greater (or lesser than the original signal (FIG. 4a) in the absense of wobble. The half-frequency envelope of the detector signal (corresponding to curve 150') will then have the same difference between maximum and minimum values as does the 150' curve and therefore, the final output (at 168 and 169) will be substantially the same as before. Although this wobble will therefore contribute some noise in the original detector signals (by making the various minimum points 135, 137 in FIG. 3a, and 145, 147 in FIG. 4a somewhat greater in value), the error signal which may be introduced by the wobble is completely (at least as to the first order) self-cancelling. As previously stated, any wobble having a different frequency than this will not affect the demodulated signal (i.e., will be averaged out), so that the final D.C. output will be substantially free of any spurious error signal. The one exception to this is a wobble having a frequency of twice the shaft rotation, which would cause the first hump of the detector signal (having its peak at 136') to be, say, increased and the second hump (peaked at 138') to be, say, decreased. Fortunately, this type of periodic wobble is not likely since it is at twice the natural (rotation) wobble frequency. Further, the gyroscope system may be either so shaped or else weighted to minimize any such frequency wobble.

Thus, the device of the invention is capable of accurately monitoring the angular position of the spin axis and, therefore, of the gyroscope rotor 16 about both of the horizontal axes, and of giving an indication of any tilt thereof in both magnitude and direction about each of these axes. Physically, it is really the rest of the device which normally tilts relative to a fixed gyroscope spin axis, but for convenience we have considered the gyroscope as the tilting element. Since these two angles uniquely determine the position of the gyroscope relative to the housing 12 (and the vehicle or the like to which the housing is attached), these final output signals may be utilized to give control signals for the orienting of any controlled device which is intended to have a given angular relationship with the gyroscope axis. Since it is preferable to maintain the optical axis of the monitoring device approximately parallel to the axis of the gyroscope shaft as previously pointed out, these control signals may be utilized to reorient the gyroscope housing 12 to which the monitoring device is attached. In other words, the monitoring device is preferably used as a nulling type of alignment indicator.

Of course, the various parameters of the system, such as the focal length of the optical system (element 80), the size of the prism nose, the angle of the prism faces (65–68), and the intentional canting of mirror surface 36 relative to the shaft, may be varied in order to give a lesser or greater sensitivity to the instrument. Generally speaking, the higher the sensitivity or precision of the device, the greater becomes the need to keep the optical axis more or less parallel to the gyroscope shaft axis. The reason for this can be readily seen. If the parameters are such that the angle of the spin axis relative to the optical axis causes the returning square image to fall entirely on one slanted surface of the prism, the instrument will be entirely unable to determine the angular position of the spin axis about one of the two horizontal axes (and will of course indicate a saturated error signal as to the other axis).

A specific embodiment of the device, similar to the preferred embodiment illustrated, has been designed which has a resolution and long term stability of approximately ⅕ of an arc second and an acquisition range of ±½°. For this high precision application, the cross-modulation of the signals generated by the two detectors (corresponding to 100 and 101) is such that an error of only about one part per 100 is caused in one of the final signals by tilting of the gyroscope about the other horizontal axis by an amount of up to one minute of arc. The output of this device is also substantially linear (to about one part of 100) in relation to the measured tilt angle as long as the monitoring device is maintained within one minute of parallelism with the shaft axis. This high degree of precision is obtained with a monitoring device so small that the entire length of the device (i.e., from the bottom of housing 40 to the top of housing 44) is only a little oven an inch. Although as previously stated the device is intended to be operated at or near the null or parallel condition, these figures show the inherent linearity of the system at non-null condition. It can thus be seen that the invention provides an extremely sensitive and precise monitoring of the relative position of a gyroscope about the two axes perpendicular to the spin axis.

Although the device has been described in conjunction with the monitoring of a gyroscope, it obviously may be used for many different applications. For example, it may be utilized to test the trueness of bearings or shafts or the angular position of any rotating element to a very high degree of precision. For example, the position of a shaft or bearing used for mounting high precision devices, such as radar antenna or telescopes may be aligned by using the device. Since as outlined above, many different uses of the device are not only possible, but quite feasible, and certain modifications of the device may obviously be made in order to adapt it to these various uses, the invention is not limited to any of the specific details of the preferred embodiment disclosed. Similarly, various substitutions of obviously equivalent elements may be made. For example, refractive, reflective or catadioptric optical systems may be used. The use of fiber optics, although highly desirable in order to insure even distribution of the light and uniform sensitivity of detection, is not critical for the light source and is not absolutely necessary at the detectors. The type of sensing prism illustrated offers definite advantages in both compactness and accuracy (since the surface thereof cannot move relative to each other or the nose of the prism which operates as the exit and entrance slit of the device). Nevertheless, other means of supplying the returning light to two pairs of detectors may be utilized. For example, a similar prism with a round (flat) nose and a cylindrical arrangement of detectors may be utilized. Similarly, the various other elements are not, in themselves, essential to the invention.

For the above reasons, the invention is not limited to any of the specific details of the disclosed embodiment, but rather is defined in the appended claims.

I claim:

1. A device for monitoring the angular tilt of the axis of a rotating body as determined by reflection of light from a reflector means mounted with its surface approximately perpendicular to said axis, comprising:
   a light source;
   an optical prism having a clear nose portion and at least a pair of opposed sides adjacent and angled relative to said clear nose portion;
   first means for channeling a substantial part of the light emitted by said source to said clear nose portion of said prism, so that said light passes therethrough;
   convergent optical means so positioned that said clear nose portion is substantially in the focal plane thereof, so that said light after passage through said nose portion is collimated thereby;
   said reflector means on the monitored rotating body therefore returning said collimated light back to said convergent optical means;
   said optical means refocussing said returned collimated light as returned converging light, forming an image of said nose portion in substantially the same focal plane;
   at least one detector means;
   and second means for channeling at least a substantial part of any of said returned converging light falling on each of said opposed prism sides to the same said detector means.

2. The device according to claim 1, in which:
   at least one of said light channeling means comprises fiber optics.

3. A device for monitoring the angular tilt of the axis of a rotating body as determined by reflection of light from a reflector means mounted with its surface approximately perpendicular to said axis, comprising:
   a light source for projecting a light beam;
   an exit slit means having a clear aperture of a particular shape and size;
   means for channeling a substantial part of the light beam emitted by said source through said exit slit means, so that said light beam is limited in cross-section to said shape and size of said clear aperture;
   convergent optical means so positioned that said exit slit means is substantially in the focal plane thereof, so that said light beam of limited cross-section is collimated thereby to form a collimated light beam;
   said reflector means on the monitored rotating body therefore returning said collimated light beam back to said convergent optical means;
   said optical means refocussing said returned collimated light beam as returned converging light, forming an image of said clear aperture of said exit slit means in substantially the same focal plane;

at least one detector means;

and light directing means for channeling at least a substantial part of any of said returned converging light falling on opposite sides of said clear aperture of said exit slit means to the same said detector means.

4. The monitoring device of claim 3, in which:

said clear aperture of said exit slit means comprises a substantially transparent first surface of an optical elment;

and said light directing means comprises at least a second different surface of the same optical element, which second surface affects the light impinging thereon in a manner different from said transparent first surface.

5. The monitoring device of claim 4, in which:

said second surface is reflective.

6. The monitoring device of claim 5, in which:

said second surface is at a substantial angle to said first transparent surface.

7. The monitoring device of claim 4, in which:

said second surface is at a substantial angle to said first transparent surface.

8. A device for monitoring the angular tilt of the axis of a rotating body as determined by reflection of light from a reflector means mounted with its surface approximately perpendicular to said axis, comprising:

a light source;

an optical prism having a clear nose portion and two pairs of opposed sides adjacent and angled relative to said clear nose portion;

means for channeling a substantial part of the light emitted by said source to said clear nose portion of said prism, so that said light passes therethrough;

convergent optical means so positioned that said clear nose portion is substantially in the focal plane thereof, so that said light after passage through said nose portion is collimated thereby;

said reflector means on the monitored rotating body therefore returning said collimated light back to said convergent optical means;

said optical means refocussing said returned collimated light as returned converging light, forming an image of said nose portion in substantially the same focal plane;

a first detector means;

a first light directing means for channeling at least a a substantial part of any of said returned converging light falling on each of one pair of said opposed prism sides to said first detector means;

a second detector means;

and second light directing means for channeling at least a substantial part of any of said returned converging light falling on each of the other pair of opposed prism sides to said second detector means.

9. A device for monitoring the angular tilt of the axis of a rotating body comprising:

a light source for projecting a light beam;

an exit slit means having a clear aperture of a particular shape and size;

means for channeling a substantial part of the light beam emitted by said source through said exit slit means, so that said light beam is limited in cross-section to said shape and size of said clear aperture;

convergent optical means so positioned that said exit slit means is substantially in the focal plane thereof, so that said light beam of limited cross-section is collimated thereby to form a collimated light beam;

reflector means mounted on the monitored rotating body nearly perpendicular to its rotation axis, returning said collimated light back to said convergent optical means;

said optical means refocussing said returned collimated light beam as returned converging light forming an image of said clear aperture of said exit slit means in substantially the same focal plane;

the rotation of said nearly perpendicular reflector means causing said image to move in a circular path in said focal plane;

at least one detector means;

and directing means for channeling at least a substantial part of any of said returned converging light falling on opposite sides of said clear aperture of said exit slit means to the same said detector means.

10. The monitoring device of claim 9, in which:

said detector means includes distinguishing means for comparing (a) the detector response to said returned converging light when said rotating reflector means is in one rotative position to (b) said detector response when said reflector means is in another rotative position, differing from said one rotative position by substantially 180°;

whereby an indication of the tilt of said axis of said rotating body relative to at least one line is obtained as to both angle, size and directional sense.

11. The monitoring device of claim 10, in which:

a second detector means and a second directing means are provided, in such position that said second directing means channels a substantial part of any of said returned converging light falling on a second set of opposed sides of said clear aperture to said second detector;

each of said second set of opposed sides being angularly positioned substantially midway between said first mentioned opposite sides;

and said second detector means includes second distinguishing means for comparing (c) the response of said second detector when said rotating reflector means is in a third rotative position to (d) said second detector response when said reflector means is in a fourth position, differing from said third rotative position by substantially 180°;

whereby said second detector means gives an indication of both the size and sense of the angle of tilt of said axis of said rotating body relative to a second line, substantially perpendicular to said one line;

said device thereby yielding a pair of Cartesian angles representing the position of said rotating body axis.

References Cited by the Examiner

UNITED STATES PATENTS

| | | | |
|---|---|---|---|
| 2,806,402 | 9/1957 | Ferris | 88—1 |
| 2,825,021 | 2/1958 | Friend | 250—203 X |
| 2,959,060 | 11/1960 | Kunz | 74—5.6 |
| 2,965,763 | 12/1960 | Lemmerman | 250—203 |
| 2,999,939 | 9/1961 | Bible et al. | 88—1 X |
| 3,071,976 | 1/1963 | Kunz | 74—5.6 |

RALPH G. NILSON, *Primary Examiner.*

WOLTER STOLWEIN, MAYNARD R. WILBUR,
*Examiners.*